Dec. 22, 1925.
S. ISHIZAKA
1,566,872
WATER TURBINE GENERATOR
Filed August 25, 1924
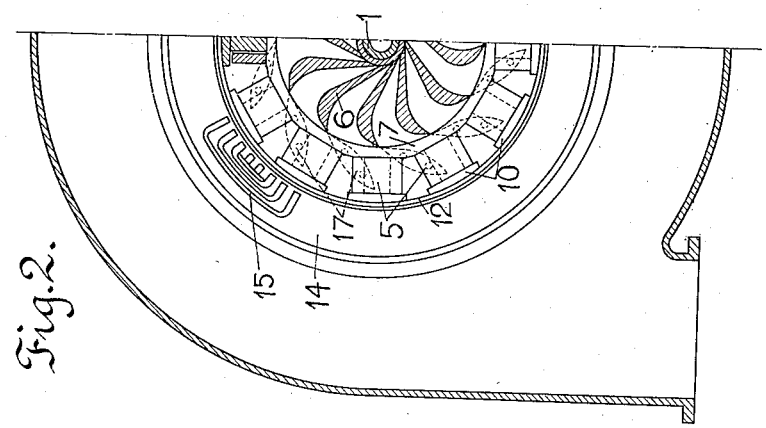
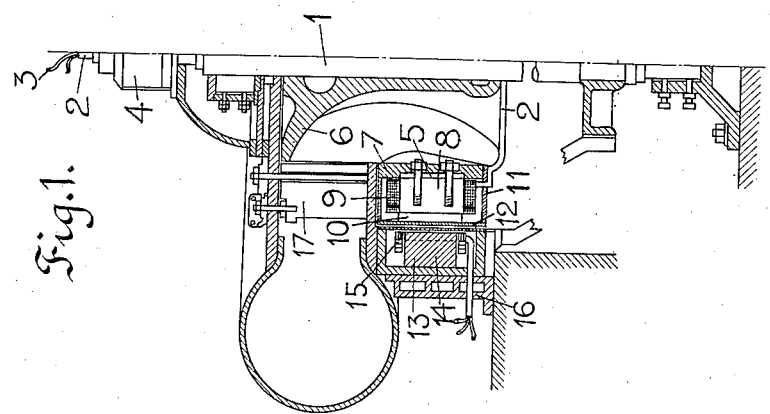
INVENTOR
SANSAKU ISHIZAKA
BY
ATTORNEYS Patented Dec. 22, 1925.

1,566,872

UNITED STATES PATENT OFFICE.

SANSAKU ISHIZAKA, OF KOCHI-KEN, JAPAN.

WATER-TURBINE GENERATOR.

Application filed August 25, 1924. Serial No. 733,927.

*To all whom it may concern:*

Be it known that I, SANSAKU ISHIZAKA, a subject of the Emperor of Japan, residing at Kochi-Ken, Japan, have invented certain new and useful Improvements in Water-Turbine Generators, of which the following is a specification.

This invention relates to improvements in water turbine generators, in which a generator is combined with a water turbine.

The object of the present invention is to provide for a water turbine-generator, in which the generator part can be cooled by water flowing through the turbine part, thus increasing the output of the hydro-electric plant.

The water turbine-generator according to this invention is characterized by the fact that a series of field magnets (or armature) are (or is) attached to the outside of the runner of a water turbine, and at the outside of said field magnets (or armature) is (or are) provided a stationary armature (or a series of field magnets), thus the generator part being continuously cooled by water flowing through the turbine part.

In order that the invention may be thoroughly understood a more detailed description will be given and reference will be made to the accompanying drawings, wherein:

Fig. 1 shows a front view in section of the half of an example of the machine according to the invention, and Fig. 2 shows a plan view in section of the same as above.

Referring to the drawing, 1 indicates a hollow shaft of the machine, through which is conducted a metal pipe 2 receiving two insulated wires 3 therein which extend from an exciter 4 mounted on the top of the turbine part to a series of field magnets 5; and 6 denotes a runner which serves as a support for said field magnets.

To the outside of the runner 6 is attached the field yoke 7, to which are rigidly secured the field magnets 5, each of the latter consisting of the field core 8, the field coil 9 and the pole piece 10. All of said field magnets are watertightly enclosed by a circular ring 12 and two annular plates 11, both of which are made of non-magnetic alloy, for instance phosphor bronze, and the spaces between them and the field magnets are filled with a phenol condensation product or other insulating compounds.

At the outside of the field magnets 5 is provided a stationary armature 13, which consists of the armature core 14 and the armature coil 15, and is also watertightly enclosed in similar manner as in the case of the field magnets 5 and filled with insulating compounds. 16 designates the generator casing, comprising a water jacket.

When the machine is started, the water directed by means of a series of guide vanes 17 passes through the runner 6, thus cooling the field cores 8 and the field coils 9 through the field yoke 7 to prevent the burning-out of said field coils, due to over-heating. On the other hand, a small amount of water enters into the generator casing 16, thus cooling the armature core 14 and the armature coils 15 to prevent the burning-out of said armature coils due to over-heating.

Hence the output of the machine can be considerably increased, although the exciting current needs to be more or less increased by reason of the increased clearance existing between the field magnets and the armature.

If direct current is required, a dynamo may be similarly combined with a water turbine.

It is obvious that the invention is not confined to the particular construction as shown but may be carried into effect in various manners without departing from the scope of the invention.

Claims—

1. A water turbine generator comprising a series of field magnets, a water turbine runner to the outside of which the field magnets are attached, and a stationary armature surrounding said magnets, the generator part of the device thus being continuously cooled by water flowing through the turbine part of the device.

2. A water turbine generator comprising a series of field magnets, a water turbine runner to the outside of which the field magnets are attached, a stationary armature surrounding said magnets, and a jacketed casing for the generator part, the latter part thus being continuously cooled by water flowing through the turbine of the device.

In testimony whereof I have affixed my signature.

SANSAKU ISHIZAKA.